(12) United States Patent
Horikawa

(10) Patent No.: US 9,081,605 B2
(45) Date of Patent: Jul. 14, 2015

(54) CONFLICTING SUB-PROCESS IDENTIFICATION METHOD, APPARATUS AND COMPUTER PROGRAM

(75) Inventor: Takashi Horikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1497 days.

(21) Appl. No.: 12/053,641

(22) Filed: Mar. 24, 2008

(65) Prior Publication Data

US 2008/0244583 A1      Oct. 2, 2008

(30) Foreign Application Priority Data

Mar. 27, 2007   (JP) ................................ 2007-081366
Feb. 29, 2008   (JP) ................................ 2008-049366

(51) Int. Cl.
G06F 9/52    (2006.01)
G06F 9/46    (2006.01)

(52) U.S. Cl.
CPC .. *G06F 9/466* (2013.01); *G06F 9/52* (2013.01)

(58) Field of Classification Search
USPC ......................................................... 718/102
See application file for complete search history.

(56) References Cited

U.S. PATENT DOCUMENTS 6,813,760 B1 * 11/2004 Fitzel et al. ................... 717/131
7,278,057 B2 * 10/2007 Betancourt et al. ......... 714/38.11
7,552,208 B2 * 6/2009 Lubrecht et al. .............. 709/223
2005/0050404 A1 * 3/2005 Castelli et al. ................. 714/57
2006/0190596 A1 * 8/2006 Horikawa ...................... 709/224
2006/0242642 A1 * 10/2006 Yamamura et al. ........... 718/100
2007/0157210 A1 * 7/2007 Inoue ............................ 718/105

OTHER PUBLICATIONS

"Performance Analysis of a Client-Server System Using Queueing Networks: A Case Study", T. Horikawa et al., Int. Trans. Opl Res., vol. 4, No. 3, pp. 199-209, 1997.
"HyPerformix", HyPerformix and Predictive IT Management, Copyright 2001-2007, HyPerformix publishes new text: Fundamentals, 2 pages.

* cited by examiner

*Primary Examiner* — Meng An
*Assistant Examiner* — Michael Ayers
(74) *Attorney, Agent, or Firm* — Young & Thompson

(57) ABSTRACT

A technique for identifying conflicting sub-processes easily in a computer system that processes a plurality of transactions in parallel is provided.
In a conflicting sub-process identification method according to the present invention, a comparison is made between processing time periods for which transactions executed in parallel have conflicting parts and for which transactions executed in parallel do not have conflicting parts. This comparison is made for a plurality of transaction processing programs each comprising a plurality of sub-processes. Then, on the basis of correspondence relationships between performance indices obtained from the comparison result, conflicting combination of sub-processes competing for a resource are identified.

6 Claims, 12 Drawing Sheets

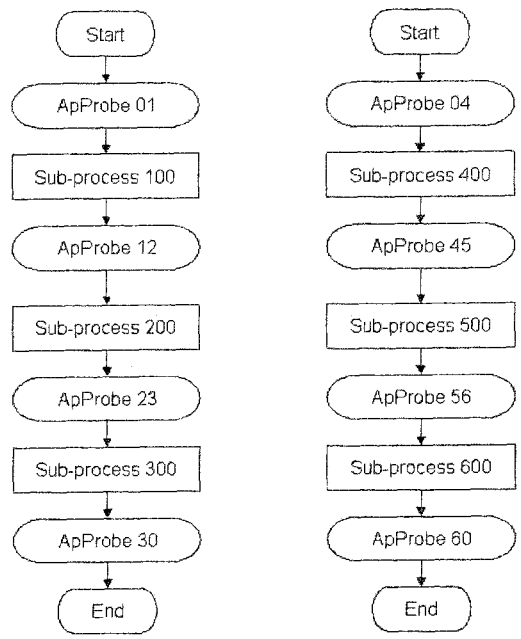
FIG.3A  FIG.3B
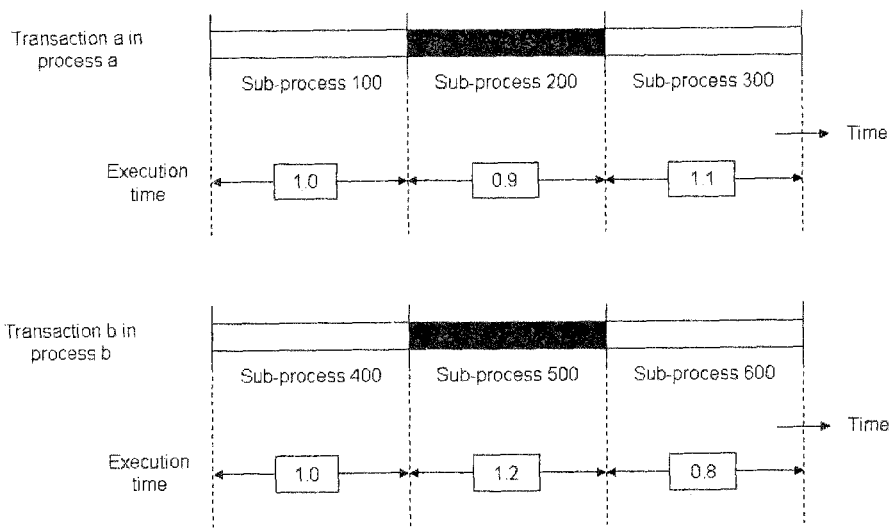
FIG.4

| Time | CPU No. | Event |
|---|---|---|
| t11 | 1 | ApProbe 01 |
| t12 | 1 | ApProbe 12 |
| t13 | 2 | ApProbe 04 |
| t14 | 1 | ApProbe 23 |
| t15 | 2 | ApProbe 45 |
| t16 | 1 | ApProbe 30 |
| t17 | 2 | ApProbe 56 |
| t18 | 2 | ApProbe 60 |

|  |  | Process a | | | | Total execution time of sub-processes of process b |
|---|---|---|---|---|---|---|
|  |  | None (0) | Sub-process 100 | Sub-process 200 | Sub-process 300 | |
| Process b | None (0) |  |  | 0.1 | 1.1 |  |
|  | Sub-process 400 | 0.6 | 0.4 |  |  | 1.0 |
|  | Sub-process 500 |  | 0.6 | 0.6 |  | 1.2 |
|  | Sub-process 600 |  |  | 0.8 |  | 0.8 |
|  | Total execution time of sub-processes of process a |  | 1.0 | 1.5 | 1.1 |  |

FIG.11

|  |  | Process a | | | | Total execution time of sub-processes of process b |
|---|---|---|---|---|---|---|
|  |  | None (0) | Sub-process 100 | Sub-process 200 | Sub-process 300 | |
| Process b | None (0) |  | 0.6 | 0.1 | 1.1 |  |
|  | Sub-process 400 | 0.6 | 0.8 | 0.6 |  | 2.0 |
|  | Sub-process 500 | 0.1 | 0.6 | 0.9 | 1.1 | 2.7 |
|  | Sub-process 600 | 0.8 |  | 0.8 |  | 1.6 |
|  | Total execution time of sub-processes of process a |  | 2.0 | 2.4 | 2.2 |  |

FIG.12

|  |  | Process a | | |
|---|---|---|---|---|
|  |  | Sub-process 100 | Sub-process 200 | Sub-process 300 |
| Process b | Sub-process 400 | ○ | ○ |  |
|  | Sub-process 500 | ○ | ○ | ○ |
|  | Sub-process 600 |  | ○ |  |
| Total execution time of sub-process of process a | | 1.0 | 1.2 | 1.1 |
| Difference in execution time of sub-process of process a | | 0.0 | 0.3 | 0.0 |

| Total execution time of sub-process of process b | Difference in execution time of sub-process of process b |
|---|---|
| 1.0 | 0.0 |
| 1.35 | 0.15 |
| 0.8 | 0.0 |

FIG.13

|  |  | Process a | | |
|---|---|---|---|---|
|  |  | Sub-process 100 | Sub-process 200 | Sub-process 300 |
| Process b | Sub-process 400 |  | 0.3 |  |
|  | Sub-process 500 | 0.15 | 0.3+0.15 | 0.15 |
|  | Sub-process 600 |  | 0.3 |  |

| Difference in execution time of sub-process of process b |
|---|
| 0.0 |
| 0.15 |
| 0.0 |

| Difference in execution time of sub-process of process a | | | |
|---|---|---|---|
| | 0.0 | 0.3 | 0.0 |

FIG.14

List of sub-processes in execution

Tabulation result

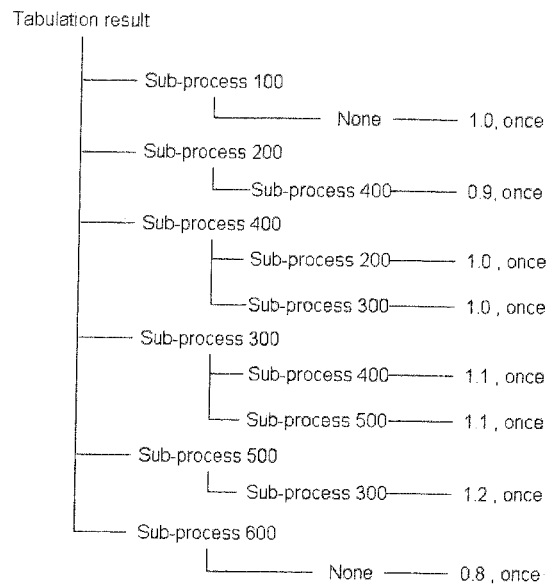

Tabulation result
├── Sub-process 100
│       └── None ——— 1.0, once
├── Sub-process 200
│       └── Sub-process 400 ——— 0.9, once
├── Sub-process 400
│       ├── Sub-process 200 ——— 1.0, once
│       └── Sub-process 300 ——— 1.0, once
├── Sub-process 300
│       ├── Sub-process 400 ——— 1.1, once
│       └── Sub-process 500 ——— 1.1, once
├── Sub-process 500
│       └── Sub-process 300 ——— 1.2, once
└── Sub-process 600
        └── None ——— 0.8, once

FIG.18

| | None | Sub-process 100 | Sub-process 200 | Sub-process 300 | Sub-process 400 | Sub-process 500 | Sub-process 600 |
|---|---|---|---|---|---|---|---|
| Sub-process 100 | 1.0, once | | | | | | |
| Sub-process 200 | | | | | 0.9, once | | |
| Sub-process 300 | | | | | 1.1, once | 1.1, once | |
| Sub-process 400 | | | 1.0, once | 1.0, once | | | |
| Sub-process 500 | | | | 0.2, once | | | |
| Sub-process 600 | 0.8, once | | | | | | |

FIG.19

|  | None | Sub-process 100 | Sub-process 200 | Sub-process 300 | Sub-process 400 | Sub-process 500 | Sub-process 600 |
|---|---|---|---|---|---|---|---|
| Sub-process 100 |  |  |  |  | 1.0, once |  |  |
| Sub-process 200 |  |  |  |  | 0.9, once | 0.9, once |  |
| Sub-process 300 |  |  |  |  |  | 1.1, once |  |
| Sub-process 400 |  | 1.0, once | 1.0, once |  |  |  |  |
| Sub-process 500 |  |  | 1.5, once | 1.5, once |  |  |  |
| Sub-process 600 | 0.8, once |  |  |  |  |  |  |

FIG.20

|  | None | Sub-process 100 | Sub-process 200 | Sub-process 300 | Sub-process 400 | Sub-process 500 | Sub-process 600 |
|---|---|---|---|---|---|---|---|
| Sub-process 100 |  |  |  |  | 1.0, once | 1.0, once |  |
| Sub-process 200 |  |  |  |  |  | 1.5, once | 1.5, once |
| Sub-process 300 | 1.1, once |  |  |  |  |  |  |
| Sub-process 400 |  | 1.0, once |  |  |  |  |  |
| Sub-process 500 |  | 1.2, once | 1.2, once |  |  |  |  |
| Sub-process 600 |  |  | 0.8, once |  |  |  |  |

FIG.21

|  | None | Sub-process 100 | Sub-process 200 | Sub-process 300 | Sub-process 400 | Sub-process 500 | Sub-process 600 |
|---|---|---|---|---|---|---|---|
| Sub-process 100 | 1.0, once (1.0) |  |  |  | 2.0, twice (1.0) | 1.0, once (1.0) |  |
| Sub-process 200 | 0.9, once (0.9) |  |  |  | 0.9, once (0.9) | 2.4, twice (1.2) | 1.5, once (1.5) |
| Sub-process 300 | 2.2, twice (1.1) |  |  |  |  | 1.1, once (1.1) |  |
| Sub-process 400 | 1.0, once (1.0) | 2.0, twice (1.0) | 1.0, once (1.0) |  |  |  |  |
| Sub-process 500 | 1.2, once (1.2) | 1.2, once (1.2) | 2.7, twice (1.35) | 1.5, once (1.5) |  |  |  |
| Sub-process 600 | 1.6, twice (0.8) |  | 0.8, once (0.8) |  |  |  |  |

FIG.22

|  | Sub-process 100 | Sub-process 200 | Sub-process 300 | Sub-process 400 | Sub-process 500 | Sub-process 600 |
|---|---|---|---|---|---|---|
| Sub-process 100 |  |  |  | 0.0 | 0.0 |  |
| Sub-process 200 |  |  |  | 0.0 | 0.3 | 0.6 |
| Sub-process 300 |  |  |  |  | 0.0 |  |
| Sub-process 400 | 0.0 | 0.0 |  |  |  |  |
| Sub-process 500 | 0.0 | 0.15 | 0.3 |  |  |  |
| Sub-process 600 |  | 0.0 |  |  |  |  |

FIG.23

CONFLICTING SUB-PROCESS IDENTIFICATION METHOD, APPARATUS AND COMPUTER PROGRAM

BACKGROUND OF THE INVENTION

1. Field of the Invention

The present invention relates to identifying a part in a server where a plurality of processes competes for a resource. In particular, the present invention relates to a technique to identify conflicting processes in a server on the occurrence of a conflict attributable to concurrent processing of a plurality of transactions.

2. Description of the Related Art

A first related art is a technique described in Takashi Horikawa, "Performance Analysis of a Client-Server System Using Queueing Networks: A Case Study," Int. Trans. Opl Res. Vol. 4, No. 3, pp. 199-209, 1997, and is a technique to evaluate the performance of a server that concurrently processes a plurality of transactions. In the first related art, an evaluation is made by using: basic performance data, which is the time spent on using a server resource (such as a CPU or a disk) for processing a single transaction; and a performance evaluation model based on the queuing network theory. By use of this technique, the performance of a server processing a plurality of transactions (mainly a relationship between the throughput of the server and the respective response times for the transactions) is evaluated.

A second related art uses a performance simulator as a performance evaluation model, and the performance of a server processing a plurality of transactions is evaluated on the basis of the time spent on using a server resource as in the first related art.

With the performance evaluation models used in the first and second related arts, performance is evaluated generally on the assumption that the following conditions are satisfied.

(1) Time spent on using a server resource for processing a single transaction remains unchanged even if the number of transactions to be processed by the server per unit of time varies.

(2) The resource for which a plurality of transactions compete is a server resource indicated by input data (basic performance data).

When a server that executes a program for processing transactions satisfies the conditions (1) and (2), a result obtained by using any of the performance evaluation models reflects the actual performance of the server. An example of such a result is a relationship between the throughput of the server and the respective response times for transactions.

On the other hand, when the conditions (1) and (2) are not satisfied, a result obtained by using any of the performance models does not reflect the actual performance of the server. For example, the performance of a server having a plurality of CPUs is evaluated by using a performance evaluation model in some cases, even when the server executes a program including a critical section during transaction processing. In such a case, the result of the evaluation shows higher performance than the actual performance of the server. In other words, the actual performance is poorer than the result obtained on the basis of the performance evaluation model. Incidentally, a critical section is a section that cannot be executed concurrently, in a session of a transaction processing program, and in a session of another transaction processing program.

A description is given of an example of a state where the server performance evaluated by use of a performance evaluation model does not reflect the actual performance of the server. FIG. 1 shows a progress of processing in the case where a server having four CPUs concurrently starts Processes 1 to 4 respectively of four transactions. A program executed by each of CPUs for processing the transaction (hereinafter, simply referred to as a transaction processing program) includes processes that can be processed concurrently with other processes, and processes that require mutual exclusion control. Mutual exclusion control may be enforced on the processes that require mutual exclusion control, by using a spin lock during transaction processing. One of the four CPUs obtains the right to execute a critical section process, while the remaining three CPUs are in a busy wait. The three CPUs cannot process transactions while being in a busy wait.

As shown in FIG. 1, transactions each including a critical section are executed respectively in Processes 1 to 4. Each of the transactions requires 3 sections of CPU time. In Process 1, a critical section process is executed from Time 1 to Time 2. Meanwhile, in Process 2, the CPU is in a busy wait from Time 1 to Time 2. Then, in Process 2, a critical section process is executed from Time 2 to Time 3. A critical section process starts from Time 3 in Process 3, and from Time 4 in Process 4. It takes 3 sections of CPU time to process a single transaction in Process 1, while the processing of transactions requires 4, 5 and 6 sections of CPU time in Processes 2, 3 and 4, respectively. Thus, 4.5 sections of CPU time are required on average to process a single transaction in the four CPUs. Hence, longer CPU time is required to process a single transaction in the above case than the case of processing a transaction including no critical section process.

In general, a process that requires mutual exclusion control does not constitute the entire transaction. A transaction comprises a series of a plurality of sub-processes, and a process that requires mutual exclusion control is applicable to one or some sub-processes of the transaction in many cases. Given this fact, desired is a method of reducing an effect of conflicts between a sub-process that requires mutual exclusion and other sub-processes, or a method of resolving conflicts between a sub-process that requires mutual exclusion and other sub-processes. By use of such a method, the discrepancy between the evaluated processing time and actual processing time can be resolved. Moreover, a server achieves performance as expected from an evaluation result based on a performance model. To reduce an effect of a conflict or to resolve a conflict, a combination of conflicting sub-processes needs to be identified.

However, there has been no method of identifying a combination of conflicting sub-processes, heretofore. Hence, an expert who has advanced knowledge has to check the operation of a server by using a combination of various measurement tools to identify conflicting sub-processes, and then, on the basis of the results and the expert's experience, a bottleneck in which sub-processes compete for a resource is estimated. Such a above technique has problems that a considerable amount of human resource is required, and that time spent on the identification process is likely to be long. Moreover, estimation results are not always correct, and estimated conflicting sub-processes are sometimes inaccurate. As a result, countermeasures taken afterwards come to nothing. Accordingly, the process of identifying a bottleneck in which sub-processes compete for a resource has been a factor of an increase in system building costs.

SUMMARY

Exemplary embodiments of the present invention overcome the above disadvantages and other disadvantages not described above. Also, the present invention is not required to overcome the disadvantages described above, and an exemplary embodiment of the present invention may not overcome any of the problems described above.

The Exemplary embodiments of the present invention have been made in view of the above-described problems. An object of The Exemplary embodiments of the present invention is to provide a technique for identifying conflicting sub-processes in a computer system that processes a plurality of transactions in parallel. A program that processes transactions is referred to as a transaction processing program, and a single transaction processing program comprises a plurality of sub-processes.

The Exemplary embodiment of the present invention provides a technique for identifying a conflicting combination of sub-processes among a plurality of transaction processing programs in the following manner. Firstly, a comparison is made between processing time periods for which transactions executed in parallel have conflicting parts and for which transactions executed in parallel do not have conflicting parts. This comparison is made for a plurality of transaction processing programs each comprising a plurality of sub-processes. Then, on the basis of correspondence relationships between performance indices obtained from the comparison result, sub-processes competing for a resource are identified. By use of this technique, conflicting combination of sub-processes can be identified easily. Consequently, a reduction in a human resource and working hours can be achieved. Moreover, system building costs can also be reduced.

BRIEF DESCRIPTION OF THE DRAWINGS

This above-mentioned and other objects, features and advantages of this invention iscome more apparent by reference to the following detailed description of the invention taken in conjunction with the accompanying drawings, wherein:

FIGS. 3A and 3B are flowcharts respectively for illustrating relationships between application probes and sub-processes in transaction processing program a, and for illustrating relationships between application probes and sub-processes in transaction processing program b.

FIG. 4 shows diagrams each provided to explain: the order of sub-processes executed in a transaction in a process; and CPU time used by each of the sub-processes.

FIG. 11 is a table showing correspondence relationships between CPU times and combinations of sub-processes of processes a and b in the operation state shown in FIG. 9.

FIG. 12 is a table in which each of the sections shows the sum of the CPU times shown in the sections, in the tables of FIGS. 10 and 11, for the corresponding combination of sub-processes.

FIG. 13 is a table for showing a state where a tabulator 5 has performed some processes on FIG. 12.

FIG. 14 is a table for showing a state where the tabulator 5 has performed more processes on FIG. 13.

FIG. 18 is an example of the analysis result list.

FIG. 19 shows the results in FIG. 8 in matrix representation.

FIG. 20 is a table generated on the basis of an analysis of the operating state shown in FIG. 8 carried out by an analyzer 4. The table shows combinations of sub-processes, CPU times used by the combinations, and the number of execution times of the combinations.

FIG. 21 is a table generated on the basis of an analysis of the operating state shown in FIG. 9 carried out by an analyzer 4. The table shows combinations of sub-processes, CPU times used by the combinations, and the number of execution times of the combinations.

FIG. 22 is a table showing a mean value of CPU times for each of the combinations of sub-processes, the mean values each obtained by dividing the sum of the CPU times by the sum of the numbers of execution times of the corresponding combination of sub-processes shown in the tables of FIGS. 20 and 21.

FIG. 23 is a table showing, for each of the combinations of processes, a difference between the mean value shown in the section for the combination of processes and the mean value shown in the corresponding section "none" in FIG. 22.

DETAILED DESCRIPTION OF THE PREFERRED EMBODIMENT

A conflicting sub-process identification method of the present invention is described in detail below with reference to the accompanying drawings.

Figure 1:
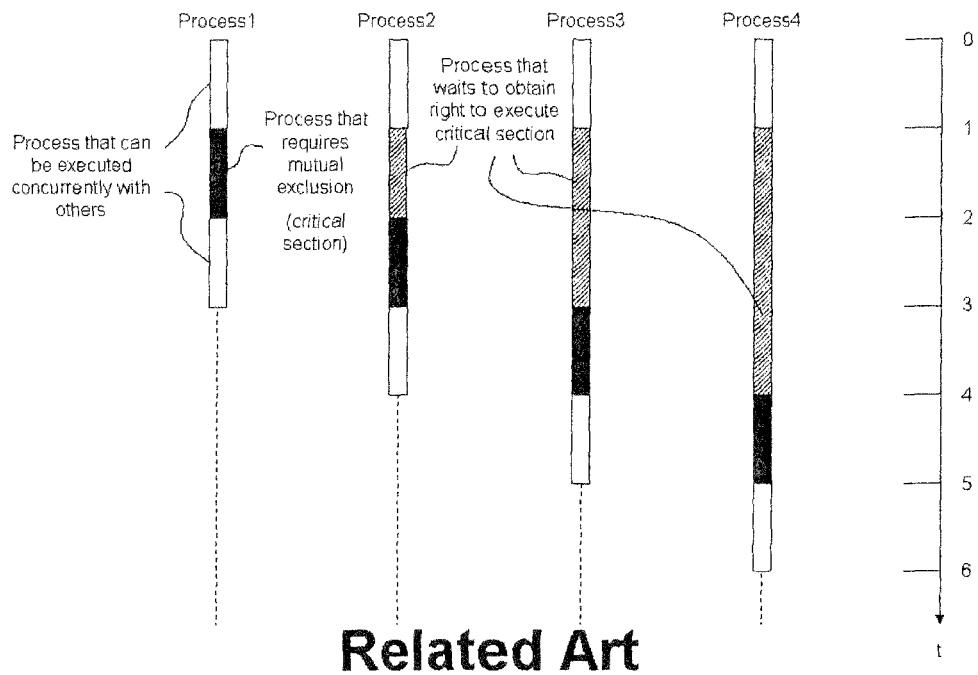
FIG. 1 is a diagram showing a progress of processing when a server having four CPUs starts executing four transactions at the same time.
Figure 2:
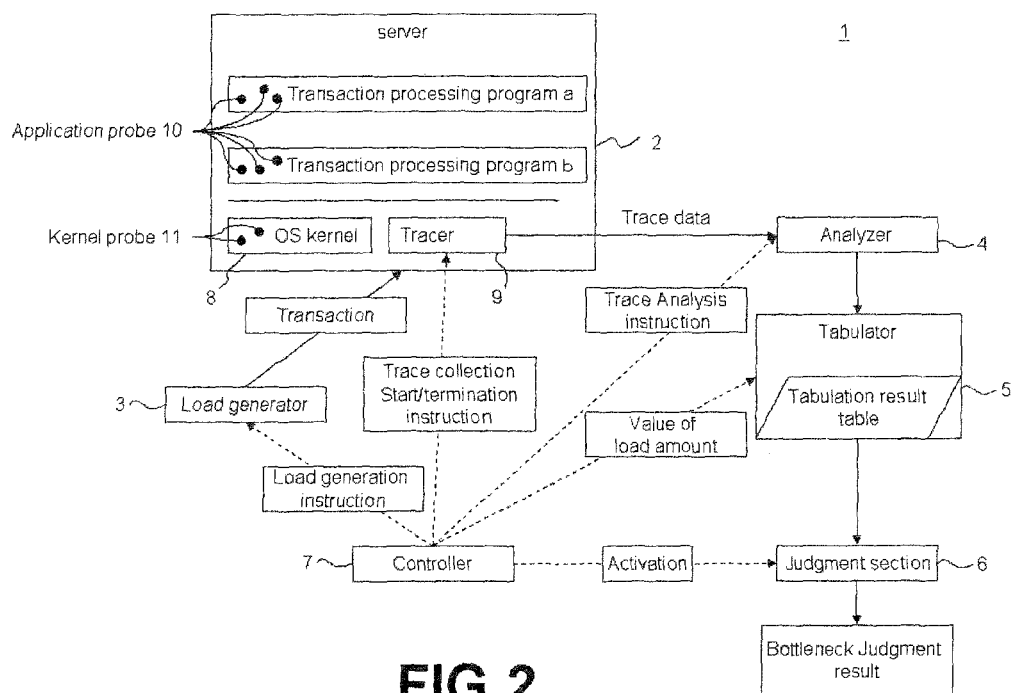
FIG. 2 is a functional block diagram of a conflicting sub-process identification apparatus 1 according to an embodiment of the present invention.

Hereinbelow, a conflicting sub-process identification apparatus 1 as an Exemplary embodiment of the present invention is described. As shown in FIG. 2, the conflicting sub-process identification apparatus 1 comprises a server 2, a load generator 3, an analyzer 4, a tabulator 5, a judgment section 6 and a controller 7.

The server 2 is an object of the measurement. The operation of the server 2 is controlled by some program. And the server 2 includes a transaction processing program a, a transaction processing program b, an operating system (OS) kernel 8 and a tracer 9. The server 2 processes two types of transactions, a transaction a and a transaction b. Although the case of processing two transactions is used for the description in this embodiment, an actual server may process more than three types of transactions. A program that executes the transaction a is the transaction processing program a, and a program that executes the transaction b is the transaction processing program b. The server 2 further includes two CPUs, not illustrated in FIG. 2. The transaction processing programs a and b are each executed by a different CPU. In this event, part of the transaction processing program a and part of the transaction processing program b may be executed concurrently. Hereinafter, the case in which at least a part of the transaction processing a and a part of the transaction processing b is executed concurrently is described. The transaction processing programs a and b each have built-in application probes 10, which output information on the execution state of the corresponding transaction processing program. The OS kernel 8 has built-in kernel probes 11, which output information on the execution state of the OS kernel 8. Hereinafter, the application probes 10 and the kernel probes 11 are simply referred to as probes collectively.

FIG. 3A shows a processing flow of the transaction processing program a. The transaction processing program a includes sub-processes 100, 200 and 300. Transaction start information, transaction termination information, and sub-process switching information are stored in the tracer 9. To store information in the tracer 9, the application probes 10, included in the transaction processing program a, collect transaction start information and termination information, and also sub-process switching information. In FIG. 3A, ApProbe 01, ApProbe 12, ApProbe 23 and ApProbe 30 are given as the application probes.

FIG. 3B shows a processing flow of the transaction processing program b. The transaction processing program b includes sub-processes 400, 500 and 600. Transaction start information, transaction termination information, and sub-process switching information are collected by the application probes 10 included in the transaction processing program b, as in the case shown in FIG. 3A. In FIG. 3B, ApProbe 04, ApProbe 45, ApProbe 56 and ApProbe 60 are given as the application probes.

The OS kernel 8 is the kernel of an operating system that supports parallel execution of a plurality of programs (multi-process). The OS kernel 8 receives a transaction request from the load generator 3. Then, the OS kernel 8 passes the received transaction to the appropriate transaction processing program, to execute the transaction. Thereafter, the OS kernel 8 sends the transaction processing results back to the source of the transaction processing request. The OS kernel 8 is provided with the kernel probes 11. In the OS kernel 8, the kernel probes 11 are provided in the part to execute a return process (start/restart CPU utilization) and the part to execute a save process (suspend/terminate CPU utilization), for example. Each of the kernel probes 11 outputs information on execution states of a process to return and to save a process.

In the present invention, a transaction is defined as a process comprising a series of a plurality of sub-processes. Also in the present invention, parallel processing means that a plurality of transactions are processed or executed in parallel. When a single CPU is provided, the state where a plurality of transactions appear to be executed concurrently. In this case, the CPU time is divided into extremely short time units, and the time units are sequentially assigned to the plurality of transactions. By contrast, when a plurality of CPUs are provided, parallel processing in the present invention refers to the state where a plurality of transactions are respectively assigned to the plurality of CPUs, and are then executed concurrently. Here, parallel processing and multi-process refer to the same concept.

The tracer 9 receives information of program execution states from the application probes 10 and the kernel probes 11. Then, the tracer 9 stores the received information therein as time series data. This time series data is referred to as trace data below. The tracer 9 starts and terminates trace data collection in accordance with a trace collection start instruction and a trace collection termination instruction from the controller 7.

The load generator 3 sends a transaction to the server 2 in accordance with a load generation instruction from the controller 7. The load generation instruction includes a specified load amount, for example.

The analyzer 4 receives a trace analysis instruction from the controller 7. In accordance with the trace analysis instruction, the analyzer 4 receives trace data from the tracer 9, and then analyzes the trace data, to obtain CPU time used for execution of each of the sub-processes. In the analysis process for obtaining the CPU time, the method described in Japanese Patent Application Publication No. 2006-227999 may be used. The analyzer 4 then inputs the trace data to an analysis process. The analyzer 4 can obtain the respective CPU times used for execution of the sub-processes in accordance with the trace data. FIG. 4 shows the CPU times (relative values) used to execute the sub-processes of the transactions a and b, respectively. The CPU times shown in FIG. 4 FICS. are times used when the transactions a and b are executed independently.

The tabulator 5 receives the analysis results from the analyzer 4 and also a value indicating the amount of load from the controller 7, and thereby stores the analysis results and the value as an analysis result table.

The judgment section 6 receives an activation instruction from the controller 7 and also the analysis result table from the tabulator 5. Then, in accordance with the activation instruction, the judgment section 6 starts to identify, on the basis of the analysis result table, a combination of sub-processes that has caused a conflict between the transaction processing programs a and b. Thereafter, the judgment section 6 outputs the identified combination of sub-processes as a bottleneck determination result.

The controller 7 gives instructions to execute a series of processes (1) to (5) below, for each of two types of loads having different load amounts. Two types of loads are the load that does not have any conflicting combination of sub-processes between transactions and the load that have some conflicting combination of sub-processes between transactions.

(1) The controller 7 instructs the load generator 3 to generate load of a specified load amount.

(2) Then, the controller 7 instructs the tracer 9 to start trace data collection, and to terminate the trace data collection.

(3) The controller 7 instructs the analyzer 4 to analyze the trace data.

(4) Thereafter, the controller 7 provides the tabulator 5 with a value indicating the load amount, and then instructs the tabulator 5 to generate an analysis result table.

(5) The controller 7 instructs the judgment section 6 to identify a conflicting combination of sub-processes on the basis of the analysis result table.

In this exemplary embodiment of the present invention, the transaction sub-processes 200 and 500 are critical sections, which cannot be executed concurrently. Hence, mutual exclusion using a spin lock is applied to one of the transaction sub-processes 200 and 500, so that the spin-locked sub-process, one of the sub-processes 200 and 500, cannot access to the resource. Specifically, when different CPUs are to execute the sub-processes 200 and 500, respectively, a spin lock is applied to the CPU starting the corresponding sub-process later, so that mutual exclusion is implemented. In other words, the CPU starting the corresponding sub-process later is caused to wait until the CPU, starting to execute the corresponding sub-process, completes the processing of the critical section. In this exemplary embodiment of the present invention, although not known in advance, the sub-processes 200 and 500 are identified as a conflicting combination of sub-processes for a resource due to being critical sections.

Next, a first example of processing flow in this exemplary embodiment of the present invention is described. In this example, a plurality of transactions are executed by a plurality of CPUs, and sub-processes that compete with each other for a resource are identified in the plurality of transactions.

Figure 15:
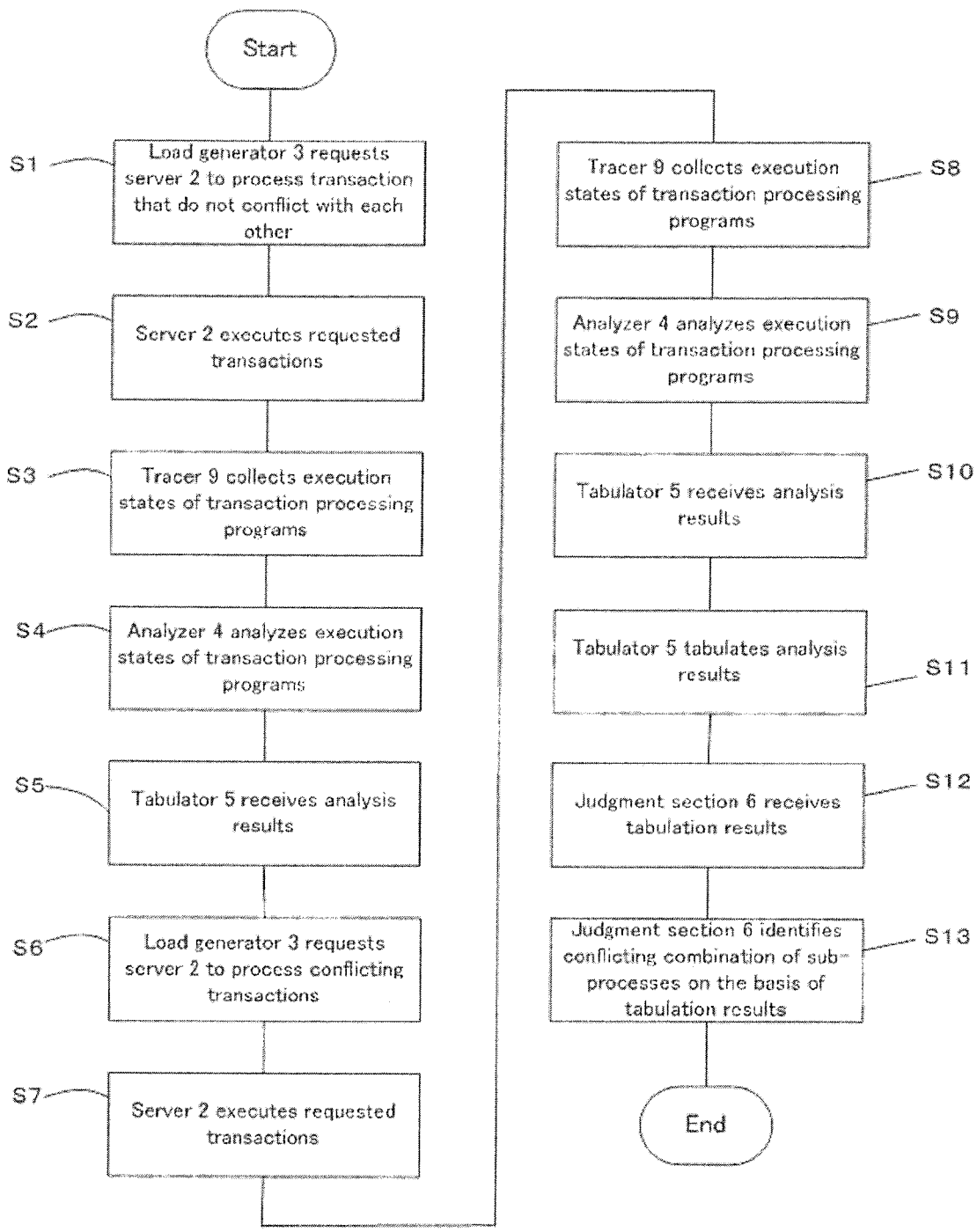
FIG. 15 is a flowchart of operation according to the embodiment of the present invention.

In the conflicting sub-process identification apparatus 1 of the first example, two kinds of loads are applied to the server 2. The conflicting sub-process identification apparatus 1 obtains CPU times used respectively for the sub-processes. The CPU time is obtained by use of the trace data collected in each of the operating states of the conflicting sub-process identification apparatus 1 when each of the two types of loads is applied thereto. From the results, the conflicting sub-process identification apparatus 1 of the first example identifies conflicting combination of sub-processes in the transactions. The conflicting sub-process identification apparatus 1 of the first example is described in detail below, and a flowchart of the first example is shown in FIG. 15.

Figures 5, 6:
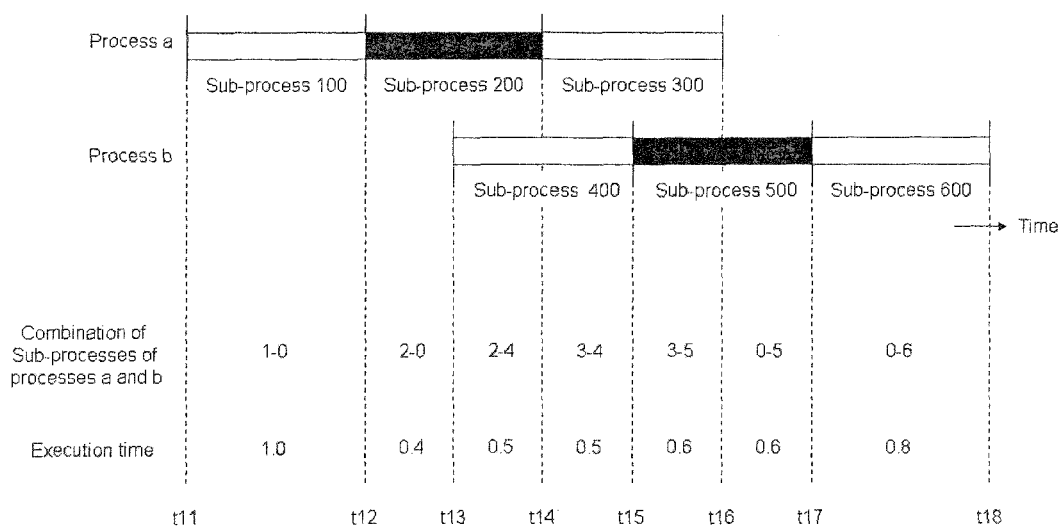
FIG. 5 is an example of trace data showing an operating state of a server 2 when a load not to cause any conflict between transactions is applied.
FIG. 6 is a timing chart of the trace data shown in FIG. 5.

Firstly, the controller 7 instructs the load generator 3 to generate a load of an amount not to cause any conflict between transactions. An example of a state in which no conflict occurs between transactions is where only a single transaction is processed at a time. In such a case, the load generator 3 sends a first transaction request, and then sends the next transaction request after receiving a response to the first request. This enables a state in which no conflict occurs between transactions. The load generator 3 then sends a transaction request to the server 2 for execution of the transactions having a specified load amount at a specified frequency, the load amount and the frequency specified by the controller 7 (S1). Then, the server 2 executes the transactions requested by the load generator 3 (S2). FIG. 5 shows an example of trace data showing an operating state of the server 2 when transactions that do not compete with each other for a resource are requested. In FIG. 6, the trace data of FIG. 5 is shown in the form of a timing chart. Here, the server 2 includes two CPUs, a CPU 1 and a CPU 2. The CPU 1 executes the transaction a by using a transaction processing program a, while the CPU 2 executes the transaction b by using a transaction processing program b. Here, a process executed by the CPU 1 is referred to as a process a, and the process executed by the CPU 2 is referred to as a process b. The CPUs 1 and 2 provided in the server 2 execute the process a and the process b in parallel.

While the server 2 is processing the transactions, the controller 7 instructs the tracer 9 in the server 2 to start trace collection (S3). After the server 2 completes the processing of a predetermined appropriate number of transactions, the controller 7 instructs the tracer 9 to terminate the trace collection. Alternatively, the controller 7 may instruct the tracer 9 to terminate the trace collection with the elapse of a predetermined period of time for execution of the transactions. Thereby, the tracer 9 stores therein information on execution states of the programs from the start to the end of the trace collection, that is, the trace data showing the operating state of the server 2.

Figure 7:
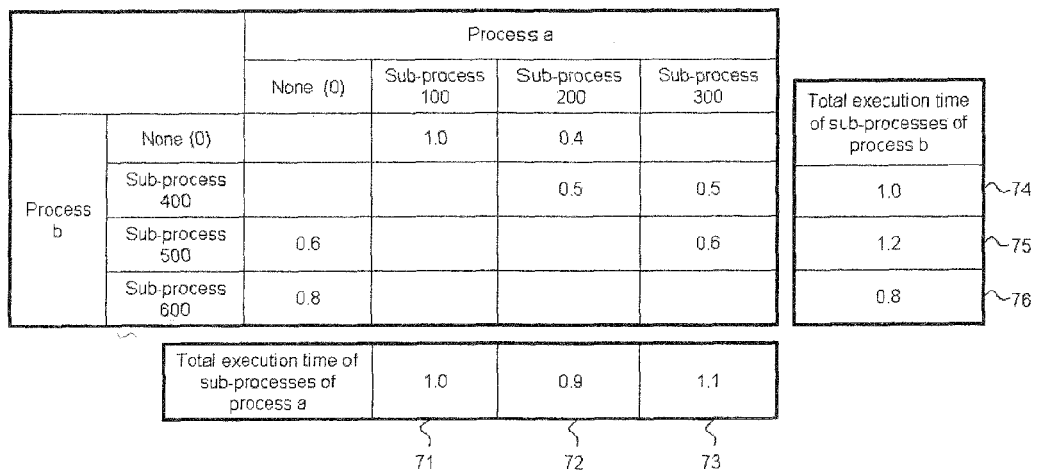
FIG. 7 is a table showing correspondence relationships between CPU times and combinations of sub-processes of processes a and b in the operating state shown in FIG. 6.

The analyzer 4 analyzes the execution states of the transaction processing programs (S4). Firstly, the analyzer 4 reads trace data in accordance with a trace analysis instruction from the controller 7. Then, referring to the trace data, the analyzer 4 classifies execution times on the basis of the combinations of a sub-process of the process a and a sub-process of the process b, the processes a and b being executed in parallel. Thereafter, the analyzer 4 obtains execution time for each of the sub-processes. FIG. 6 shows process combinations as processes a-b, and processing times corresponding respectively to the combinations. In FIG. 6, process combinations shown as processes a-b are combinations of sub-processes of the process a and the process b. Here, "2-4" indicates that a sub-process 200 of the process a and a sub-process 400 of the process b are executed in parallel. "1-0" indicates that only a sub-process 100 of the process a is executed, and that no sub-process of the process b is executed in parallel with the sub-process 100. FIG. 7 shows the execution states of FIG. 6, that is, the relationships between the execution times and the combinations of sub-processes of processes a and b, in the form of a table. In FIG. 7, the sum of the values in a column for each column is shown as the total of time spent on each of the sub-processes of the process a, and the sum of the values in a row for each row is shown as the total of time spent on each of the sub-processes of the process b. In the state shown in FIG. 6, there is no conflict between the sub-processes 200 and 500, which require mutual exclusion. Accordingly, the times spent respectively on the sub-processes are the same as those shown in FIG. 4. For example, although sub-processes 200 and 400 are executed in parallel in FIG. 6, no conflict occurs therebetween since the sub-process 400 does not require mutual exclusion. Hence, the CPU time used by the sub-process 200 in the case where the processes a and b are concurrently executed as shown in FIG. 6 is the same as that in the case where only the process a is executed as shown in FIG. 4. In both cases, the CPU time used by the sub-process 200 is 0.9, and the CPU time used by the sub-process 400 indicates 1.0.

If the server 2 executes a plurality of transactions during trace data collection, a result obtained from the analysis is the total of the values of the plurality of transactions. The number of executed transactions is obtained on the basis of the application probes included in the trace data. For example, the number of executed transactions is obtained on the basis of the number of application probes such as ApProbe 01 and ApProbe 04 that collect transaction start information. Moreover, the number of sub-processes included in each of the transactions is also obtained on the basis of the application probes included in the trace data. For example, the number of sub-processes included in each of the transactions is obtained on the basis of the number of application probes such as ApProbe 12 and ApProbe 23 that collect transaction termination information and sub-process switching information.

In this example, the analyzer 4 sends, to the tabulator 5, the analysis results for the plurality of transactions and the number of executed transactions. The analysis result are total value. The tabulator 5 receives the analysis results (S5). Then, the tabulator 5 obtains CPU time per transaction. FIG. 7 shows the "total of time spent on each sub-process of process a" and the "total of time spent on each sub-process of process b."

Then, the controller 7 instructs the load generator 3 to generate a load amount that causes a conflict between transactions. The load generator 3 sends a transaction request to the server 2 for execution of the transactions having a specified load amount at a specified frequency, the load amount and the frequency specified by the controller 7 (S6). The server 2 executes the transactions requested by the load generator 3 (S7). Then, the controller 7 gives, to the tracer 9, a trace collection start instruction and a trace collection termination instruction. The tracer 9 collects trace data of an operating state of the server 2 in the case of receiving a request to execute transactions that conflict with each other (S8). Subsequently, the controller 7 gives a trace analysis instruction to the analyzer 4, and the analyzer 4 analyzes the execution states of the transaction processing programs (S9). In accordance with the trace analysis instruction from the controller 7, the analyzer 4 reads and then analyzes the trace data.

Figure 8:
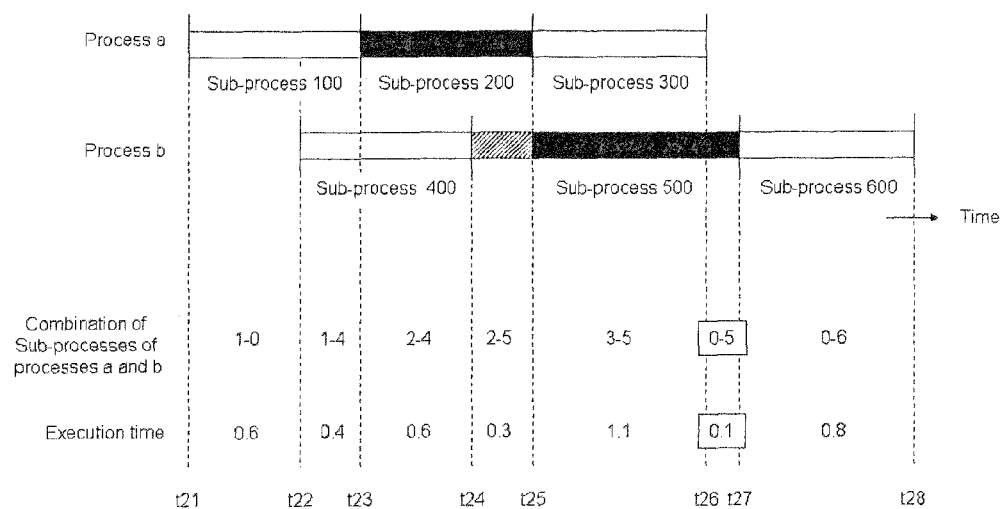
FIG. 8 shows an example of a timing chart showing an operating state of the server 2 when a load to cause a conflict between transactions is applied.
Figures 9, 10:
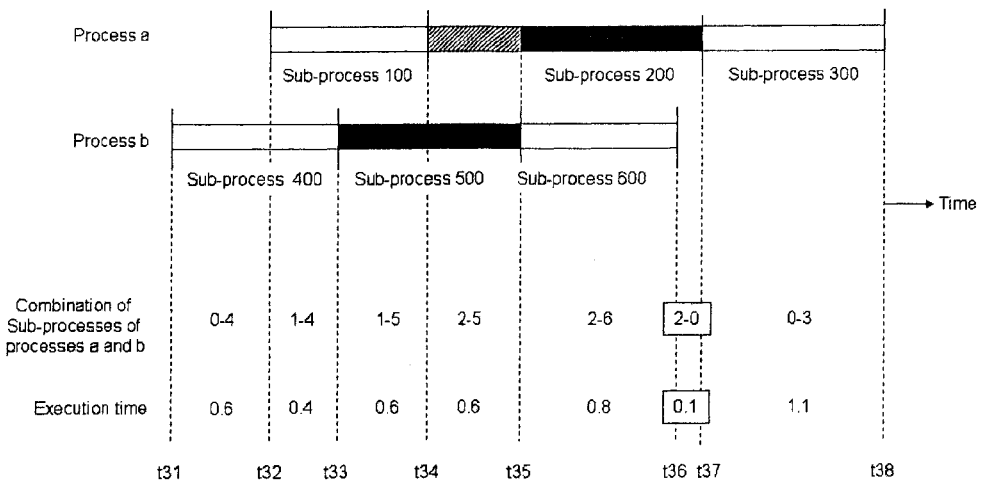
FIG. 9 shows an example of a timing chart showing another operating state of the server 2 when a load to cause a conflict between transactions is applied.
FIG. 10 is a table showing correspondence relationships between CPU times and combinations of sub-processes of processes a and b in the operation state shown in FIG. 8.

Examples of server operation are shown in FIGS. 8 and 9. In FIG. 8, the sub-process 200 of the process a and the sub-process 500 of the process b are sub-processes that require mutual exclusion. Accordingly, a conflict occurs between the sub-process 200 and the sub-process 500. In FIG. 8, the section between the sub-processes 400 and 500, that is, between time t24 and time t25, of the process b is shown as a shaded area. This shaded area indicates the status that is spin-locked.

The execution of the sub-process 200 of the process a starts first, from time t23. The execution of the sub-process 500 of the process b starts later, from time t24. Accordingly, the sub-process 500 of the process b is spin-locked so that the sub-process 500 is unable to start the process until time t25 when the execution of the sub-process 200 of the process a is completed. In FIG. 9, the sub-process 500 of the process b is executed before the sub-process 200 of the process a. Specifically, the sub-process 500 of the process b is executed from time t33, and the sub-process 200 of the process a is executed from time t34. Accordingly, the sub-process 200 of the process a is spin-locked so that the sub-process 200 is unable to start the process until time t35 when the execution of the sub-process 500 of the process b is completed.

FIGS. 10 and 11 respectively show the execution states of FIG. 8 and 9 in the form of a table, as in the case of having no conflict shown in FIG. 7. In FIG. 10, processing time spent on the sub-process 500 of the process b is 1.5. In contrast, in FIG. 7, when there is no conflict between CPU times, processing time spent on the sub-process 500 of the process b is 1.2. The processing time spent on the sub-process 500 of the process b obtained in the case shown in FIG. 10 is attributable to the fact that the process 500 of the process b is spin-locked because of a conflict with the sub-process 200 of the process a. The processing time spent on the sub-process 500 of the process b when there is a conflict between CPU times is larger than that when there is no conflict between CPU times. As in the case shown in FIG. 10, in FIG. 11, the processing time spent on the sub-process 200 of the process a is 1.5, and thus is larger than 0.9, which is the processing time in the case where no conflict occurs between CPU times. This is because the process 200 of the process a is spin-locked because of a conflict with the sub-process 500 of the process b.

When the server 2 executes a plurality of transactions that conflict with each other and the trace 9 collects trace data of the plurality of transactions, it is assumed that the conflicts shown in FIGS. 8 and 9 are included in the trace data. Here, the results obtained by analyzing the trace data are shown in a table as an aggregation of the tables shown in FIGS. 10 and 11. The aggregation of the tables shown in FIGS. 10 and 11 is shown in FIG. 12. As in the case of applying the load amount not to cause any conflict between transactions, the analyzer 4 outputs the results shown in FIG. 12 and the number of executed transactions to the tabulator 5. The tabulator 5 receives the analysis results (S10).

The tabulator 5 tabulates: the results, shown in FIG. 7, obtained by analyzing the operating state of the server 2 in the case where the load amount not to cause any conflict between the transactions is processed by the server 2; and the results, shown in FIG. 12, obtained by analyzing the operating state of the server 2 in the case where the load amount to cause a conflict between the transactions is processed by the server 2 (S11). The tabulation is performed by the following procedure.

Firstly, the tabulator 5 executes the following processes (1) to (3) on FIG. 12. Consequently, the tabulator 5 creates a table shown in FIG. 13.

(1) The tabulator 5 divides, by the number of transactions, the value in the section for total of time spent on each of the sub-processes, to obtain a value of processing time per transaction. In the above example, the two transactions a and b are processed, and hence, the tabulator 5 divides, by 2, each of the values shown in the sections for total of time spent on each of the sub-processes.

(2) The tabulator 5 obtains, for each of the sub-processes, the difference between the value obtained as a result of the process (1) and the time spent on the corresponding sub-process when there is no conflict between the transactions. Then, the tabulator 5 enters the obtained results into the corresponding sections for processing time difference of each of the sub-processes of the process a and of the process b.

(3) The tabulator 5 deletes the column and the row of "no sub-process (0)" for the transaction a and the transaction b.

(4) The tabulator 5 marks sections each having a value other than 0. In FIG. 13, each of such sections is filled in with a circle, for example.

Next, the tabulator 5 adds a value to the sections marked by a circle in the column and the row for elements (here, the sub-processes 200 and 500) each of which has a value other than 0 in the section showing the processing time difference of the sub-processes. Here, the value to be added is the value of the processing time difference of the sub-processes. Then, the tabulator 5 executes a process to generate a table shown in FIG. 14.

Specifically, the tabulator 5 firstly provides an array in which the initial values of all the elements representing the combinations of the sub-processes of the processes a and b are 0. Thereafter, the tabulator 5 adds 0.3 to the elements that are each marked with a circle, in the column for the sub-process 200 of the process a, that is, the sections for the sub-processes 400, 500 and 600. Moreover, the tabulator 5 adds 0.15 to the elements that are each marked with a circle, in the row for the sub-process 500 of the process b, that is, the sections for the sub-processes 100, 200 and 300.

The tabulator 5 sends the tabulation results to the judgment section 6. The judgment section 6 receives the tabulation results (S12). The judgment section 6 judges the element having the largest value among the elements in the array as the element representing the conflicting sub-processes. In the example of FIG. 14, the array element having the largest value is at the intersection of the column of the sub-process 200 and the row of the sub-process 500. Accordingly, the judgment section 6 judges that the conflicting sub-processes are the sub-process 200 and the sub-process 500 (S13).

As described above, the conflicting sub-process identification apparatus of the first example can identify the conflicting combination of sub-processes on the basis of trace data of the operation of the server when there is no conflict, and trace data of the operation of the server when there is a conflict.

Hereinbelow, a second example of exemplary embodiment of the present invention is described. The functional block configuration of the second example is same as that of the conflicting sub-process identification apparatus 1 of the first example. Hence, the functional block configuration of the second example is shown in FIG. 2. Aspects those are different from the conflicting sub-process identification apparatus 1 of the first example is described below.

FIG. 3A shows the processing flow of the transaction processing program a. The transaction processing program a includes the sub-processes 100, 200 and 300. Transaction start information, transaction completion information, and sub-process switching information are stored in the tracer 9. To store information in the tracer 9, the application probes 10 included in the transaction processing program a collect transaction start information and completion information, and sub-process switching information. In FIG. 3A, ApProbe 01, ApProbe 12, ApProbe 23 and ApProbe 30 are given as the application probes.

FIG. 3B shows the processing flow of the transaction processing program b. The transaction processing program b includes the sub-processes 400, 500 and 600. Transaction start information, transaction completion information, and sub-process switching information are collected by the application probes 10 included in the transaction processing program b, as in the case shown in FIG. 3A. In FIG. 3B, ApProbe 04, ApProbe 45, ApProbe 56 and ApProbe 60 are given as the application probes.

In the second example, the conflicting sub-process identification apparatus 1 is described by focusing on the start and the termination of each of the sub-processes. For example, two kinds of operations, the termination of the sub-process 100 and the start of the sub-process 200, are detected by the ApProbe 12. In the second embodiment, ApProbe 12 firstly detects a process corresponding to the termination of the sub-process 100, and subsequently detects a process corresponding to the start of the sub-process 200.

The analyzer 4 reads one event at a time from trace data. The events include the start and the termination of a transaction, execution of a sub-process, the start and the termination of a sub-process, and the like. The analyzer 4 performs operation corresponding to each of the events. For example, the analyzer 4 performs operation for obtaining CPU time used by a sub-process, and operation corresponding to the start or the termination of a sub-process. Furthermore, the analyzer 4 may have a list of sub-processes in execution as a list shown in FIG. 16 to update the list. Alternatively, the analyzer 4 may receive a tabulation result list shown in FIG. 17 from the tabulator 5 to update the tabulation result list.

Figure 16:
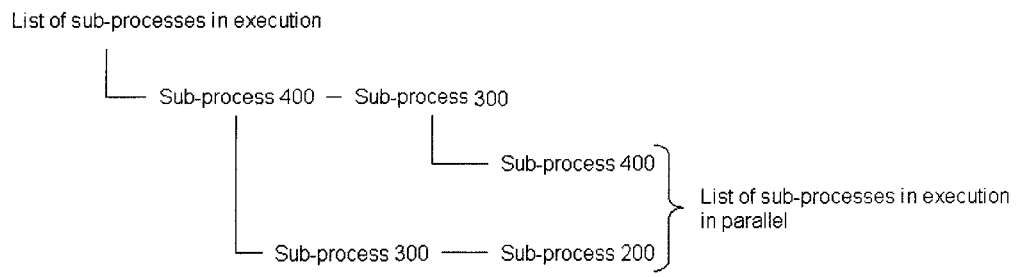
FIG. 16 is an example of a list of sub-processes in execution.

The list of sub-processes in execution shown in FIG. 16 has a data structure for showing the following two types of sub-processes.

(1) Sub-processes each of which is executed by the server 2 at the time when an event occurs (2) Other sub-processes that are executed in parallel with each of the sub-processes The analyzer 4 adds an element to the list of sub-processes in execution, or deletes an element from the list, in accordance with the event read from the trace data.

Figure 17:
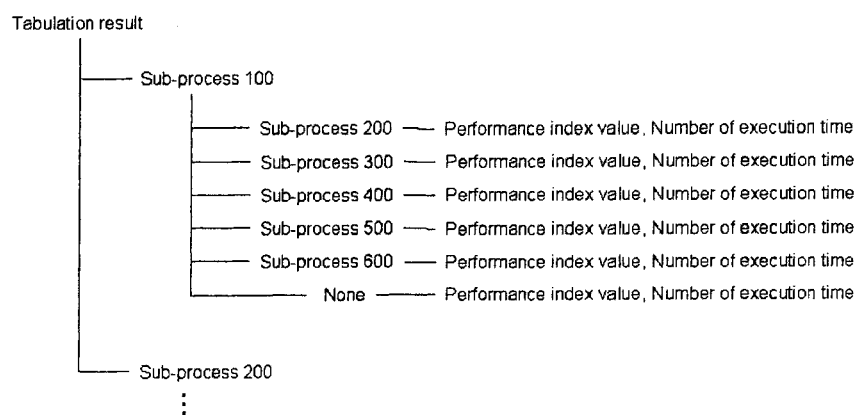
FIG. 17 is a list for illustrating a structure of an analysis result list.

The tabulation result list shown in FIG. 17 has a data structure representing operation results of each of the sub-processes. When performing analysis operation by reading events from the trace data, the analyzer 4 adds an element to the tabulation list or performs an add operation on a value retained in the tabulation list.

When the event read from the trace data is an event indicating the start of a sub-process, the analyzer 4 performs the following analysis operation.

(1) The analyzer 4 creates an element that corresponds to the sub-process of the event in the list of sub-processes in execution. Then, the analyzer 4 adds the sub-processes that are retained in the list of processes in execution at the time, to a list of sub-processes executed in parallel, held by the element (hereinafter, referred to as start operation 1).

(2) The analyzer 4 appends the sub-processes related to the start event, to the list of sub-processes executed in parallel held by each of the sub-processes retained in the list of sub-processes in execution at the time (hereinafter, referred to as start operation 2).

(3) The analyzer 4 adds the list element created in the start operation 1 to the list of sub-processes in execution (hereinafter, referred to as start operation 3).

When the event read from the trace data is an event indicating the termination of a sub-process, the analyzer 4 performs the following analysis operation.

(1) The analyzer 4 obtains a performance index of the sub-process included in the event. For example, in the second example, the analyzer 4 obtains CPU time (hereinafter, referred to as termination operation 1).

(2) With respect to each of the elements that are in the list of sub-processes executed in parallel held by the sub-process included in the event (such elements referred to as other sub-processes, hereinafter), the analyzer 4 adds the performance index of the sub-process obtained in the termination operation 1, to the performance index in the section of other sub-processes related to the event indicating the termination of the sub-process, included in the tabulation results. When the sub-process whose performance index is obtained in the termination operation 1 is not included in the sections for other sub-processes, the analyzer 4 creates a section for another sub-process. Furthermore, the analyzer 4 adds 1 to the value shown in the section of the number of execution times of the sub-process (hereinafter, referred to as termination operation 2).

(3) The analyzer 4 deletes, from the list of sub-processes in execution, the elements representing the sub-processes related to the event indicating the termination of the sub-process (hereinafter, referred to as termination operation 3).

In the termination operation 2, when no sub-processes are included in the list of sub-processes executed in parallel held by the sub-process included in the event, the operation is performed on the section having "none" filled therein.

Next, a specific example of the operation performed by the analyzer 4 is described with reference to the event sequence shown in FIG. 5. FIG. 6 shows the timing chart of the event sequence shown in FIG.5. The operation to be performed when trace data including the event sequence of FIG. 5 is inputted is described below. Here, t11, t12, ..., t18, each enclosed in parentheses and appearing at the beginning of lines correspond to the times shown in FIG. 6. A method for generating the tabulation result shown in FIG. 18 is described below.

(t11) ApProbe 01 indicating the start of the sub-process 100 is inputted. At this time, the list of sub-processes in execution is empty. Hence, the start operations 1 and 2 are not performed. The sub-process 100 is appended to the list of sub-processes in execution by the start operation 3.

(t12) When ApProbe 12 is inputted, the operation for the termination of the sub-process 100 is performed. Then, the operation for the start of the sub-process 200 is performed. In the operation for the termination of the sub-process 100, the analyzer 4 obtains the CPU time 1.0 used for the sub-process 100 by the termination operation 1.

Thereafter, the termination operation 2 is performed. At this time, the list of sub-processes executed in parallel held by the sub-process 100 appended to the list of sub-processes in execution is empty. Accordingly, a section for "none" is created for the sub-process 100 in the tabulation results. Then, 1.0, obtained by the termination process 1, is added to the performance index value in the section "none" of the sub-process 100. Moreover, I is added to the number of execution times in the section "none" of the sub-process 100. Subsequently, the elements of the sub-process 100 are deleted from the list of sub-processes in execution by the termination process 3.

Thereafter, the start operation for the sub-process 200 is performed. This operation is the same as the start operation for the sub-process 100. The results of the start operation for the sub-process 200 show a sate where the sub-process 200 is appended to the list of sub-processes in execution. The list of sub-processes executed in parallel held by the sub-process 200 at this time is empty.

(t13) ApProbe 04 indicating the start of the sub-process 400 is inputted. By the start operation 1, the sub-process 200 is appended to the list of sub-processes executed in parallel of the sub-process 400, which is an element to be appended to the list of sub-processes in execution. By the start operation 2, the sub-process 400 is appended to the list of sub-processes executed in parallel held by the sub-process 200 appended to the list of sub-processes in execution.

Subsequently, by the start operation 3, the list element representing the sub-process 400 created by the start operation 1 is appended to the list of sub-processes in execution. At this time, the list of sub-processes in execution is in the following state.

(1) The sub-processes 400 and 200 are appended to the list of the sub-processes in execution.

(2) The sub-process 200 is appended to the list of sub-processes executed in parallel held by the sub-process 400 in the list of sub-processes in execution. The sub-process 400 is appended to the list of sub-processes executed in parallel held by the sub-process 200 in the list of processes in execution.

(t14) ApProbe 23 indicating the termination of the sub-process 200 and the start of the sub-process 300 is inputted. Then, the operation for the termination of the sub-process 200 is performed. Thereafter, the operation for the start of the sub-process 300 is performed. In the operation for the termination of the sub-process 200, the analyzer 4 obtains the CPU time 0.9 used for the sub-process 200 by the termination operation 1.

Subsequently, the termination operation 2 is performed. The sub-process 400 is appended to the list of sub-processes executed in parallel held by the sub-process 200 appended to the list of sub-processes in execution. Accordingly, a section for "sub-process 400" is created for the sub-process 200 in the tabulation results. Then, 0.9, obtained in the termination operation 1, is added to the performance index value in the section "sub-process 400" of the sub-process 200. Moreover, 1 is added to the number of execution in the section "sub-process 400" of the sub-process 200. Thereafter, the elements of the sub-process 200 are deleted from the list of sub-processes in execution by the termination operation 3.

Next, the start operation for the sub-process 300 is performed. The start operation for the sub-process 300 is the same as that for the sub-process 400. As a result of the operation, the list for sub-processes in execution is in the following state.

(1) In the list of sub-processes in execution, the sub-process 300 is appended to the sub-process 400.

(2) In the list of sub-processes executed in parallel held by the sub-process 400 in the list of sub-processes in execution, the sub-processes 300 and 200 are appended to the sub-process 400. Moreover, in the list of sub-processes executed in parallel held by the sub-process 300 in the list of sub-processes in execution, the sub-process 400 is appended to the sub-process 300.

FIG. 16 shows the states of the list of sub-processes in execution and the list of sub-processes executed in parallel at this time.

(t15) ApProbe 45 indicating the termination of the sub-process 400 and the start of the sub-process 500 is inputted. Then, the operation for the termination of the sub-process 400 is performed. Subsequently, the operation for the start of the sub-process 500 is performed. In the operation for the termination of the sub-process 400, the analyzer 4 obtains the CPU time 1.0 used for the sub-process 400 by the termination operation 1.

Next, the termination operation 2 is performed. In this event, the sub-processes 300 and 200 are appended to the list of sub-processes executed in parallel held by the sub-process 400 appended to the list of processes in execution. Accordingly, sections for "sub-process 300" and "sub-process 200" are created for the sub-process 400 in the tabulation results. Then, 1.0, which is obtained by the termination operation 1, is added to each of the performance indices shown in the sections "sub-process 300" and "sub-process 200" of the sub-process 400. Moreover, 1 is added to each of the numbers of execution times shown in the sections "sub-process 300" and "sub-process 200" of the sub-process 400. Thereafter, the elements of the sub-process 400 are deleted from the list of sub-processes in execution by the termination operation 3. In this case, addition operation related to the performance index value and the number of execution times are performed on the plurality of sections in the tabulation results.

Next, the start operation for the sub-process 500 is performed. The start operation for the sub-process 500 is the same as those for the sub-processes 400 and 300. As a result of the operation, the list of sub-processes in execution is in the following state.

(1) In the list of sub-processes in execution, the sub-process 500 is appended to the sub-process 300.

(2) In the list of sub-processes executed in parallel held by the sub-process 500 in the list of sub-processes in execution, the sub-process 300 is appended to the sub-process 500. Moreover, in the list of sub-processes executed in parallel held by the sub-process 300 in the list of sub-processes in execution, the sub-processes 500 and 400 are appended to the sub-process 300.

FIG. 18 shows the tabulation result list obtained after the operation for inputting ApProbe 60 is performed. The result of FIG. 18 is shown in FIG. 19 in a matrix. In FIG. 19, rows correspond to the sub-processes that are under the tabulation result, and columns correspond to other sub-processes and the section "none" that are under each of the sub-processes.

The algorithm described above is applied to the data obtained by tracing the operations shown in FIGS. 8 and 9. In other words, when the trace data of the operations shown in FIGS. 8 and 9 are inputted to the analyzer 4, the matrix tables shown in FIGS. 20 and 21 are respectively obtained. FIG. 22 shows the sum of the results of FIGS. 20 and 21, as well as the result obtained when each of the sub-processes are independently executed once. When each of the sub-processes are independently executed once, a value is only entered to the section "none" for each of the sub-processes 100 to 600. In FIG. 22, the value in parentheses in each of the sections is the mean value of the performance indices corresponding to the section. An average value of the indices can be obtained by dividing the performance index by the number of execution times shown in the corresponding section. In the second example, the results are sent to the judgment section 6. Then, the judgment section 6 identifies conflicting sub-processes in the following procedure.

The judgment section 6 obtains the difference between the mean value of each of the element having a value in the corresponding sub-process section and the value in the section "none" of the corresponding sub-process, in FIG. 22. The results are shown in FIG. 23. Then, the judgment section 6 searches a combination of sub-processes m and n that satisfy the following condition. Specifically, the sections at which the row of the sub-process m and the column of the sub-process n intersect, and at which the row of the sub-process n and the column of the sub-process m intersect, each have a value other than 0. In FIG. 23, the combination of sub-processes 200 and 500 satisfies the given condition. As a result, the judgment section 6 judges that there is a conflict between the sub-processes 200 and 500.

As described above, the conflicting sub-process identification apparatus of the second example is capable of identifying a conflicting combination of sub-processes on the basis of the trace data of operation of the server when there is no conflict and the trace data of operation of the server when there is a conflict.

The conflicting sub-process identification apparatus of the second example is also applicable to trace data collected from a server in which more than three processes are executed in parallel. To be more specific, it is not necessary that the conflicting sub-process identification apparatus of the second example collects and analyzes trace data in the state where there is no conflict and in the state where there is a conflict separately. The conflicting sub-process identification apparatus of the second example performs tabulation operation taking account of sub-processes executed in parallel with respect to each of the sub-processes.

In the description of the conflicting sub-process identification apparatus of the second embodiment, a method of obtaining a difference between the average value of each of the elements and the value in the corresponding section "none," is described as the judgment operation performed by the judgment section 6. However, it is also possible to use a method of obtaining a mean value of the performance indices for each of the rows and then obtaining a difference between the average value of each of the elements and the obtained value in the corresponding row. In this case, the judgment section 6 may judge that the element having a positive value as the difference is affected by an increase in the performance index due to a conflict. In addition, in the description of the conflicting sub-process identification apparatus of the second example, the example of using CPU time as the performance index value is described. However, a different performance index, such as the number of instructions executed in a CPU or the number of failures in obtaining a lock for mutual exclusion, may instead be used as the performance index value.

The conflicting sub-process identification apparatus of the present invention can be used for a load test in building an information processing system, for example. In particular, the conflicting sub-process identification apparatus of the present invention can be used in a measurement/analysis device for efficiently identifying a factor of a conflict occurring when a plurality of transactions are executed in parallel in an information processing system, and may be applied to a computer program for such measurement/analysis.

The present invention has been described in detail. However, it should be appreciated that various changes may be made to the present invention without departing from its spirits and be covered by the claims.

Furthermore, it is the inventor's intent to retain all equivalents of the claimed invention even if the claims are amended during prosecution.

What is claimed is:

1. A conflicting sub-process combination identification method in a system executing a first transaction process having a plurality of first sub-processes and a second transaction process having a plurality of second sub-processes, the first and second transaction processes being executed in parallel, the conflicting sub-process combination identification method comprising the steps of:

obtaining a first conflict-less performance index for each of the first sub-processes, while the first transaction process is executed without conflict with the second transaction processes, obtaining a second conflict-less performance index for each of the second sub-processes, while the second transaction process is executed without conflict with the first transaction processes, obtaining a first conflict performance index for each of the first sub-processes, while the first transaction process is executed in a first condition of conflict with the second transaction process, wherein the first condition of conflict is when a first sub-process that requires mutual exclusion begins execution before, and is in conflict with, a second sub-process that requires mutual exclusion, obtaining a second conflict performance index for each of the second sub-processes, while the second transaction process is executed in the first condition of conflict with the first transaction process, obtaining a third conflict performance index for each of the first sub-processes, while the first transaction process is executed in a second condition of conflict with the second transaction process, wherein the second condition of conflict is when a first sub-process that requires mutual exclusion begins execution after, and is in conflict with, a second sub-process that requires mutual exclusion, obtaining a fourth conflict performance index for each of the second sub-processes, while the second transaction process is executed in the second condition of conflict with the first transaction process, and further executing a tabulating step comprising, generating a conflict-less table whose elements are the first conflict-less performance indices for each of the first sub-processes, the second conflict-less performance indices for each of the second sub-processes, a conflict-less total performance index for each of the first sub-processes that is obtained by adding the first conflict-less performance indices corresponding to each first sub-process, and a conflict-less total performance index for each of the second sub-processes that is obtained by adding the second conflict-less performance indices corresponding to each second sub-process, generating a first conflict table whose elements are the first conflict performance indices for each of the first sub-processes, the second conflict performance indices for each of the second sub-processes, a first conflict total performance index for each of the first sub-processes that is obtained by adding the first conflict performance indices corresponding to each first sub-process, and a first conflict total performance index for each of the second sub-processes that is obtained by adding the second conflict performance indices corresponding to each second sub-process, generating a second conflict table whose elements are the third conflict performance indices for each of the first sub-processes, the fourth conflict performance indices for each of the second sub-processes, a second conflict total performance index for each of the first sub-processes that is obtained by adding the third conflict performance indices corresponding to each first sub-process, and a second conflict total performance index for each of the second sub-processes that is obtained by adding the fourth conflict performance indices corresponding to each second sub-process, generating an aggregation table by adding corresponding elements of the first conflict table and the second conflict table, using the aggregation table, obtaining a conflicting value performance index for each of the first and second sub-processes by dividing each of the first conflict total performance indices and each of the second conflict total performance indices by a total number of transaction processes, obtaining differences between the conflicting value performance indices for each of the first and second sub-processes and the conflict-less total performance index, generating a difference table whose elements are a sum of the differences of each combination of first and second sub-processes;

a judgment step comprising using the difference table to judge an element having the largest value among elements in the difference table, each element corresponding to a conflicting sub-process combination, wherein the largest value identifies the lamest conflict between sub-processes, and building a performance evaluation model that utilizes the identified largest conflict between sub-processes to reflect the actual performance of the system.

2. The method of claim 1, wherein the respective performance indices are one of processor time, number of instructions executed in a CPU, and a number of failures in obtaining a lock for mutual exclusion.

3. A conflicting sub-process combination identification apparatus in a computer system executing a first transaction process having a plurality of first sub-processes and a second transaction process having a plurality of second sub-processes, the first and second transaction processes being executed in parallel, the conflicting sub-process combination identification apparatus comprising:

analyzing means for, obtaining a first conflict-less performance index for each of the first sub-processes, while the first transaction process is executed without conflict with the second transaction processes, obtaining a second conflict-less performance index for each of the second sub-processes, while the second transaction process is executed without conflict with the first transaction processes, obtaining a first conflict performance index for each of the first sub-processes, while the first transaction process is executed in a first condition of conflict with the second transaction process, wherein the first condition of conflict is when a first sub-process that requires mutual exclusion begins execution before, and is in conflict with, a second sub-process that requires mutual exclusion, obtaining a second conflict performance index for each of the second sub-processes, while the second transaction process is executed in the first condition of conflict with the first transaction process, obtaining a third conflict performance index for each of the first sub-processes, while the first transaction process is executed in a second condition of conflict with the second transaction process, wherein the second condition of conflict is when a first sub-process that requires mutual exclusion begins execution after, and is in conflict with, a second sub-process that requires mutual exclusion, obtaining a fourth conflict performance index for each of the second sub-processes, while the second transaction process is executed in the second condition of conflict with the first transaction process, tabulating means for, generating a conflict-less table whose elements are the first conflict-less performance indices for each of the first sub-processes, the second conflict-less performance indices for each of the second sub-processes, a conflict-less total performance index for each of the first sub-processes that is obtained by adding the first conflict-less performance indices corresponding to each first sub-process, and a conflict-less total performance index for each of the second sub-processes that is obtained by adding the second conflict-less performance indices corresponding to each second sub-process, generating a first conflict table whose elements are the first conflict performance indices for each of the first sub-processes, the second conflict performance indices for each of the second sub-processes, a first conflict total performance index for each of the first sub-processes that is obtained by adding the first conflict performance indices corresponding to each first sub-process, and a first conflict total performance index for each of the second sub-processes that is obtained by adding the second conflict performance indices corresponding to each second sub-process, generating a second conflict table whose elements are the third conflict performance indices for each of the first sub-processes, the fourth conflict performance indices for each of the second sub-processes, a second conflict total performance index for each of the first sub-processes that is obtained by adding the third conflict performance indices corresponding to each first sub-process, and a second conflict total performance index for each of the second sub-processes that is obtained by adding the fourth conflict performance indices corresponding to each second sub-process, generating an aggregation table by adding corresponding elements of the first conflict table and the second conflict table, using the aggregation table, obtaining a conflicting value performance index for each of the first and second sub-processes by dividing each of the first conflict total performance indices and each of the second conflict total performance indices by a total number of transaction processes, obtaining differences between the conflicting value performance indices for each of the first and second sub-processes and the conflict-less total performance index, generating a difference table whose elements are a sum of the differences of each combination of first and second sub-processes;

judgment means for using the difference table to judge an element having the largest value among elements in the difference table, each element corresponding to a conflicting sub-process combination, wherein the lamest value identifies the lamest conflict between sub-processes, and building a performance evaluation model that utilizes the identified largest conflict between sub-processes to reflect the actual performance of the system.

4. The apparatus of claim 3, wherein the respective performance indices are one of processor time, number of instructions executed in a CPU, and a number of failures in obtaining a lock for mutual exclusion.

5. A non-transient computer-readable recording medium comprising a program for executing a conflicting sub-process combination identification method in a system executing a first transaction process having a plurality of first sub-processes and a second transaction process having a plurality of second sub-processes, the first and second transaction processes being executed in parallel, the conflicting sub-process combination identification method comprising the steps of:

obtaining a first conflict-less performance index for each of the first sub-processes, while the first transaction process is executed without conflict with the second transaction processes, obtaining a second conflict-less performance index for each of the second sub-processes, while the second transaction process is executed without conflict with the first transaction processes, obtaining a first conflict performance index for each of the first sub-processes, while the first transaction process is executed in a first condition of conflict with the second transaction process, wherein the first condition of conflict is when a first sub-process that requires mutual exclusion begins execution before, and is in conflict with, a second sub-process that requires mutual exclusion, obtaining a second conflict performance index for each of the second sub-processes, while the second transaction process is executed in the first condition of conflict with the first transaction process, obtaining a third conflict performance index for each of the first sub-processes, while the first transaction process is executed in a second condition of conflict with the second transaction process, wherein the second condition of conflict is when a first sub-process that requires mutual exclusion begins execution after, and is in conflict with, a second sub-process that requires mutual exclusion, obtaining a fourth conflict performance index for each of the second sub-processes, while the second transaction process is executed in the second condition of conflict with the first transaction process, and further executing a tabulating step comprising, generating a conflict-less table whose elements are the first conflict-less performance indices for each of the first sub-processes, the second conflict-less performance indices for each of the second sub-processes, a conflict-less total performance index for each of the first sub-processes that is obtained by adding the first conflict-less performance indices corresponding to each first sub-process, and a conflict-less total performance index for each of the second sub-processes that is obtained by adding the second conflict-less performance indices corresponding to each second sub-process, generating a first conflict table whose elements are the first conflict performance indices for each of the first sub-processes, the second conflict performance indices for each of the second sub-processes, a first conflict total performance index for each of the first sub-processes that is obtained by adding the first conflict performance indices corresponding to each first sub-process, and a first conflict total performance index for each of the second sub-processes that is obtained by adding the second conflict performance indices corresponding to each second sub-process, generating a second conflict table whose elements are the third conflict performance indices for each of the first sub-processes, the fourth conflict performance indices for each of the second sub-processes, a second conflict total performance index for each of the first sub-processes that is obtained by adding the third conflict performance indices corresponding to each first sub-process, and a second conflict total performance index for each of the second sub-processes that is obtained by adding the fourth conflict performance indices corresponding to each second sub-process, generating an aggregation table by adding corresponding elements of the first conflict table and the second conflict table, using the aggregation table, obtaining a conflicting value performance index for each of the first and second sub-processes by dividing each of the first conflict total performance indices and each of the second conflict total performance indices by a total number of transaction processes, obtaining differences between the conflicting value performance indices for each of the first and second sub-processes and the conflict-less total performance index, generating a difference table whose elements are a sum of the differences of each combination of first and second sub-processes;

a judgment step comprising using the difference table to judge an element having the largest value among elements in the difference table, each element corresponding to a conflicting sub-process combination, wherein the largest value identifies the lamest conflict between sub-processes, and building a performance evaluation model that utilizes the identified largest conflict between sub-processes to reflect the actual performance of the system.

6. The medium of claim 5, wherein the respective performance indices are one of processor time, number of instructions executed in a CPU, and a number of failures in obtaining a lock for mutual exclusion.

* * * * *